US00H002122H

(19) United States
(12) Statutory Invention Registration
Schepler

(10) Reg. No.: US H2122 H
(43) Published: Sep. 6, 2005

(54) DIODE PUMPED OPTICAL PARAMETRIC OSCILLATOR

(75) Inventor: Kenneth L. Schepler, Beavercreek, OH (US)

(73) Assignee: The United States of America as represented by the Secretary of the Air Force, Washington, DC (US)

(21) Appl. No.: 09/507,915

(22) Filed: Feb. 22, 2000

(51) Int. Cl.[7] ..... H01S 3/10; H01S 3/091; H01S 3/083; H01S 3/08

(52) U.S. Cl. ..... 372/22; 372/21; 372/94; 372/70; 372/107

(58) Field of Search ..... 372/70, 20, 21, 372/22, 94; 359/330

(56) References Cited

U.S. PATENT DOCUMENTS

| | | | | |
|---|---|---|---|---|
| 4,703,992 A | | 11/1987 | Yeh | |
| 5,075,573 A | * | 12/1991 | Huignard et al. | 359/326 |
| 5,276,548 A | * | 1/1994 | Margalith | 359/330 |
| 5,640,405 A | * | 6/1997 | Wallace et al. | 372/21 |
| 5,768,302 A | | 6/1998 | Wallace et al. | |
| 5,912,910 A | * | 6/1999 | Sanders et al. | 372/22 |

OTHER PUBLICATIONS

Bosenberg et al., *Continuous–wave singly resonant optical parametric oscillator based on periodically poled $LiNbO_3$*, Optics Letters, vol. 21, No. 10, May 15, 1996, Optical Society of America.

Parke et al., *2.0 W CW, Diffraction–Limited Operation of a Monolithically Integreated Master Oscillator Power Amplifier,* IEEE Photonics Technology Letters, vol. 5, No. 3, Mar. 1993.

J. Feinberg et al., *Phase–conjugate mirrors and resonators with photorefractive materials,* Topics in Applied Physics—vol. 62, *Photorefractive Materials and their Applications,* II, P. Gunter and J.–P. Huignard, Eds. (Springer Verlag, 1989).

* cited by examiner

*Primary Examiner*—Michael J. Carone
(74) *Attorney, Agent, or Firm*—Richard Alan Lambert; Thomas L. Kundert

(57) ABSTRACT

A diode pumped optical parametric oscillator is disclosed. The apparatus includes a MOPA laser positioned to pump a photorefractive $BaTiO_3$ crystal placed within a ring resonator formed by four mirrors. The interaction of the MOPA laser light incident on the $BaTiO_3$ crystal and with the light reflected within the cavity efficiently converts the MOPA pump beam to a single frequency beam of high beam quality. Once the pump beam exceeds a threshold power level, it interacts with a nonlinear periodically poled lithium niobate crystal received within the ring cavity. The lithium niobate crystal efficiently converts the pump beam to signal and idler beams of different wavelengths, providing an efficient, tunable laser.

13 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIODE PUMPED OPTICAL PARAMETRIC OSCILLATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an apparatus for generating optical radiation, and more particularly, to a diode pumped optical parametric oscillator involving three wave interaction to generate frequency tunable laser beams.

The desirability of providing a high quality, tunable laser is well known. Many commercial applications such as environmental sensing of air pollutants and other remote sensing applications such as searching for natural gas leaks, searching for gas and oil fields and spectroscopy in general would be greatly benefited by a high quality, tunable laser. As is known in the art, if atoms or molecules that absorb light at a specific wavelength are illuminated with light of that wavelength, they can be detected with an appropriate viewer. In this way, remote sensing for pollutants, etc. by a choice of illumination wavelength is enabled. As can be appreciated, the greater the extent to which a laser is tunable, the greater utility it will have in applications such as these.

Devices known as optical parametric oscillators are sometimes utilized in the above applications because they operate to convert a first or pump laser beam into two, lower frequency beams commonly known as signal and idler beams. The signal and idler beams have wavelengths longer than that of the pump beam.

Optical parametric oscillators utilize a nonlinear process in a medium to produce signal and idler beams. The wavelengths are determined by the physical requirements that momentum and energy be conserved. These two conservation laws result in the following equations for collinear phasematching:

$$n_{pump}\omega_{pump}=n_{signal}\omega_{signal}+n_{idler}\omega_{idler}$$

$$\omega_{(pump)}=\omega_{(signal)}+\omega_{(idle)}$$

wherein ω represents frequency and n represents the refractive index, a measure of the speed of light in the nonlinear material. Since refractive index is a function of frequency, crystal orientation, and beam polarization, it is possible in some cases to simultaneously fulfill the requirements of both equations above.

A common characteristic of optical parametric oscillators is that they utilize one or more nonlinear crystals placed within a reflective cavity. The interaction of the pump beam with the nonlinear crystal gives rise to the generation of the signal and idler beams described in the equations above. The nonlinear crystal can be angularly manipulated with respect to the pump beam to provide a tuning effect; other effects such as changing the temperature of the nonlinear crystal can also be used for tuning.

A recently developed configuration for an optical parametric oscillator, described by Bosenberg. et al., *Continuous-wave singly resonant optical parametric oscillator based on periodically poled $LiNbO_3$*, Optics Letters, Vol. 21, No. 10, May 15, 1996, Optical Society of America, includes a Periodically Poled Lithium Niobate (PPLN) crystal as the nonlinear medium. This device represents a major advance over other optical parametric oscillator embodiments. High nonlinear gain, no birefringent walkoff effects, and engineerable grating periodicity make cw optical parametric oscillators a practical reality for the first time. But this device uses a neodymium-doped yttrium aluminum garnet (Nd:YAG) crystal pumped by diode lasers to provide the high power pump beam. While this device represents an advancement over the art, it is not without the need for improvement. More specifically, this device is complex because the diode laser light must be carefully coupled to the Nd laser. Moreover, Nd lasers are somewhat inefficient, typically converting only 30–40% of the diode pump power to Nd laser output power. The rest of the pump power becomes heat which must be dissipated.

While a direct substitution of the Nd:YAG laser with a high power diode laser would overcome the above described efficiency problem, as well as simplify the device, high power diode lasers typically suffer from an inherent poor beam quality, rendering them unsuitable for optical parametric oscillator applications.

A need exists therefore for an improved optical parametric oscillator pumped by an improved high efficiency laser source. Such a laser source would combine the desirable qualities of high power output, high beam quality for use within an optical parametric oscillator to provide high power, high quality output.

SUMMARY OF THE INVENTION

It is therefore a primary object of the present invention to provide a diode pumped optical parametric oscillator overcoming the limitations and disadvantages of the prior art.

It is another object of the present invention to provide a diode pumped optical parametric oscillator utilizing a simple high power diode laser beam as the pump beam.

It is yet another object of the present invention to provide a diode pumped optical parametric oscillator utilizing a quasi phase matched PPLN crystal as the nonlinear medium to provide diffraction limited high output power.

These and other objects of the invention will become apparent as the description of the representative embodiments proceeds.

In accordance with the foregoing principles and objects of the invention, a diode pumped optical parametric oscillator is provided to convert a pump laser beam at a first frequency to signal and idler beams at different frequencies.

Advantageously and according to an important aspect of the present invention, the laser pump source is a master oscillator power amplifier (MOPA) semiconductor laser. The MOPA laser provides narrowband frequency output at a watt or more output power.

The MOPA laser is positioned to pump a photorefractive $BaTiO_3$ crystal placed within a ring resonator formed by four mirrors. When pumped by the MOPA laser, the interaction of the light incident upon the $BaTiO_3$ crystal from the MOPA laser and from the light circulated within the ring resonator causes one light beam to grow at the expense of other, scattered beams due to the action of the beams within the refractive index grating created within the $BaTiO_3$ crystal. The net effect is that even poor quality pump beam power is efficiently converted to a single frequency beam of very high quality. In this way, the poor quality limitation of typical high power diode lasers is overcome. This type of laser device is described, for example, by J. Feinberg et al., *Phase-conjugate mirrors and resonators with photorefractive materials, Topics in Applied Physics—Vol.* 62, *Photorefractive Materials and their Applications,* II, P. Gunter and J.-P. Huignard, Eds. (Springer Verlag, 1989).

In operation, the circulating pump beam, as continuously refined by the $BaTiO_3$ crystal, becomes single frequency, continuous wave, and diffraction limited. Continued operation causes the pump beam power to build. Once the pump beam power exceeds a threshold level, the pump beam interacts with a nonlinear periodically poled lithium niobate $LiNbO_3$ (PPLN) crystal also placed within the ring resonator. The nonlinear PPLN crystal within the four ring resonator mirrors forms an optical parametric oscillator that interacts with the pump beam to output signal and idler beams of different wavelengths. The optical parametric oscillator operates in a nonlinear manner, and is constrained only by the requirement that momentum and energy must be conserved.

Any of the mirrors in the ring resonator can be made partially reflective at a predetermined wavelength so as to allow the output of light at that wavelength. Thus, the optical parametric oscillator receives light at a first, pump wavelength and outputs light at another wavelength, either that of the signal or idler beams. Advantageously, the $BaTiO_3$ containing ring resonator and the PPLN containing optical parametric oscillator are coextensive such that each occupies the same resonator and utilize the same set of four mirrors. This provides for a simplified, compact, highly efficient device.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
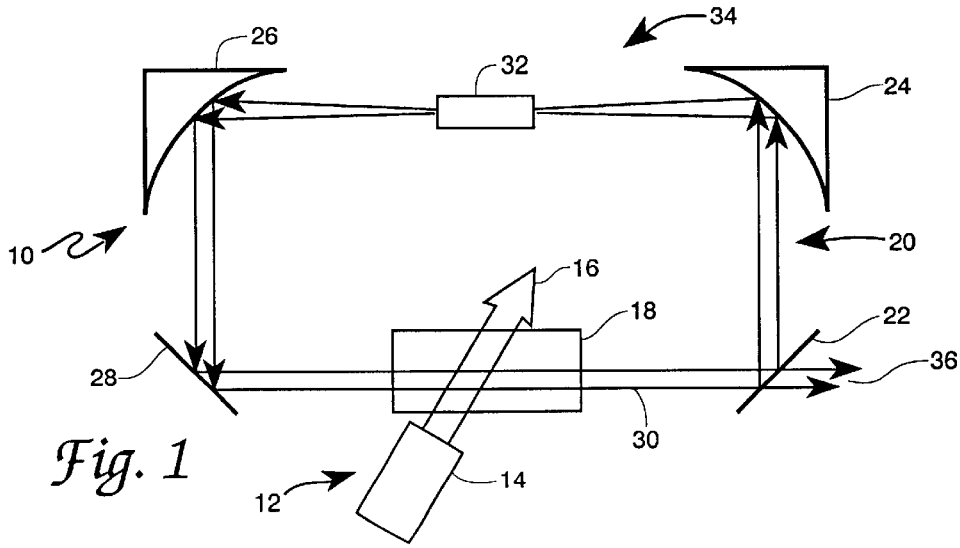
FIG. 1 is a schematic illustration of the diode pumped optical parametric oscillator of the present invention.

Reference is made to FIG. 1 showing the diode pumped optical parametric oscillator 10 of the present invention. The diode pumped optical parametric oscillator 10 includes a source of coherent light 12. Advantageously, the source of coherent light 12 in the preferred embodiment is a master oscillator power amplifier semiconductor laser (MOPA) 14. The MOPA 14 is simple to operate, requiring no complex feedback mechanism, and provides a narrowband frequency at a watt or more output power.

The coherent light pump beam 16, generated by the MOPA 14, is directed into a photorefractive element comprising a rubidium doped $BaTiO_3$ crystal 18 located within a ring resonator cavity 20. As shown, the ring resonator cavity 20 is formed by four mirrors designated 22, 24, 26 and 28 respectively. As shown, some (or all) of the mirrors 22–28, can be curved to provide tight focusing of the beams, in order to increase peak power. During operation, as the pump beam 16 is directed into the $BaTiO_3$ crystal 18, a refractive index grating is created within the crystal 18. The crystal 18 amplifies and refines the light received from the pump beam 16, and from the light reflected by the mirrors 22–28, generating a high quality single frequency beam 30 within the resonator cavity 20.

As operation continues, the single frequency beam 30 is further amplified within the resonator cavity 20 and the power level of the beam 30 correspondingly increases. Once the power of the single frequency beam 30 rises above a threshold level, it operates to pump a nonlinear periodically poled lithium niobate $LiNbO_3$ (PPLN) crystal 32 received within the ring resonator cavity 20.

According to an important aspect of the present invention, the PPLN crystal 32 operates in conjunction with the four mirrors 22, 24, 26 and 28 to form an optical parametric oscillator 34 frequency conversion element which is coextensive with the ring resonator cavity 20. The optical parametric oscillator 34, utilizes the quasi phase matching nature of the PPLN crystal 32, in cooperation with the four mirrors 22, 24, 26 and 28 to effectively convert the single frequency beam 30 into a signal beam and an idler beam.

The optical parametric oscillator 34 operates in a nonlinear manner to generate the signal and idler beams. The wavelengths are determined by the physical requirements that momentum and energy be conserved. These two conservation laws result in the following equations for collinear quasi-phasematching:

$$n_{pump}\omega_{pump}=n_{signal}\omega_{signal}+n_{idler}\omega_{idler}+k_{grating}c$$

$$\omega_{(pump)}=\omega_{(signal)}+\omega_{(idler)}$$

wherein $\omega$ represents frequency and n represents the refractive index, a measure of the speed of light c in the nonlinear material and $k_{grating}$ represents the effective momentum contributed by the poled grating.

Accordingly, it can be seen that there is no explicit requirement that the signal and idler beams be related directly to the wavelength of the pump beam as long as they satisfy these equations. Thus, it is possible to tune the laser output beam 36 over a wide range of wavelengths and frequencies by adjusting the optical parametric oscillator 34. For example, the output beam 36 of the optical parametric oscillator 34 can be effectively tuned by physically repositioning the PPLN crystal 32 with respect to the angle of the single frequency beam 30. Or the PPLN crystal 32 can have multiple grating periods poled into it and by simply translating the crystal relative to the pump beam 30 use a different grating period resulting in different output wavelengths. Or, the PPLN crystal 32 can be heated in order to affect the internal poled spacing of the crystalline structure and hence change the output.

As shown in FIG. 1, mirror 22 is made partially reflective for the desired output wavelength (signal or idler) thereby facilitating the emission of the output beam 36. The output beam 36 thus generated is a high power, continuous wave, diffraction limited beam. In this way, efficient direct pumping of an optical parametric oscillator by a diode laser is facilitated. Advantageously, the diode pumped optical parametric oscillator 10 requires no complex frequency feedback system and no complex beam control.

Figure 2:
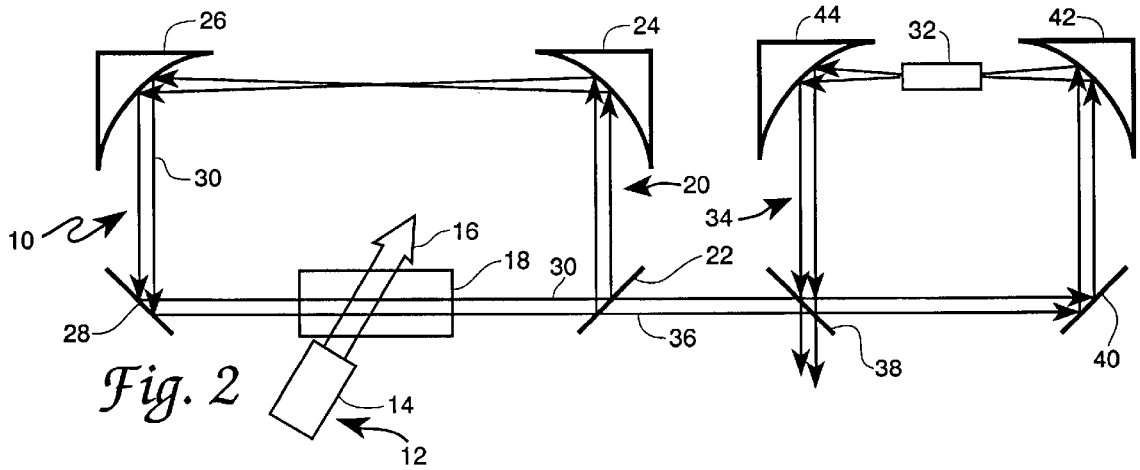
FIG. 2 is a schematic illustration of an alternative embodiment of the diode pumped optical parametric oscillator of the present invention; and, FIG. 3 is a schematic illustration of another alternative embodiment of the diode pumped optical parametric oscillator of the present invention.

Reference is now made to FIG. 2 showing an alternative embodiment of the diode pumped optical parametric oscillator 10. As shown, this alternative embodiment is arranged such that the ring resonator cavity 20 is physically separate from the optical parametric oscillator 34. As shown, the ring resonator cavity 20 includes mirrors 22, 24, 26 and 28. The optical parametric oscillator 34 includes four mirrors designated 38, 40, 42 and 44 respectively. As in the preferred embodiment, the ring resonator cavity 20 includes the $BaTiO_3$ crystal 18, and the optical parametric oscillator 34 includes the PPLN crystal 32.

The operation of this alternative embodiment is quite similar to that of the preferred embodiment. The MOPA 14 outputs a pump beam 16 which is directed into the $BaTiO_3$ crystal 18. The crystal 18 amplifies and refines the light received from the pump beam 16, generating a high quality single frequency beam 30 within the resonator cavity 20. The mirror 22 is made partially reflective to the wavelength of the single frequency beam 30, facilitating emission of the output beam 36.

The single frequency beam 36 is directed into the optical parametric oscillator 34 wherein it is reflected by the mirrors 38, 40, 42, and 44, simultaneously passing through the PPLN crystal 32. The PPLN crystal and the mirrors combine to form the desired frequency conversion element whereby the pump (single frequency beam 30) beam is split into signal and idler beams. The mirror 38 is made partially reflective as described above, to facilitate emission of the desired optical radiation.

Figure 3:
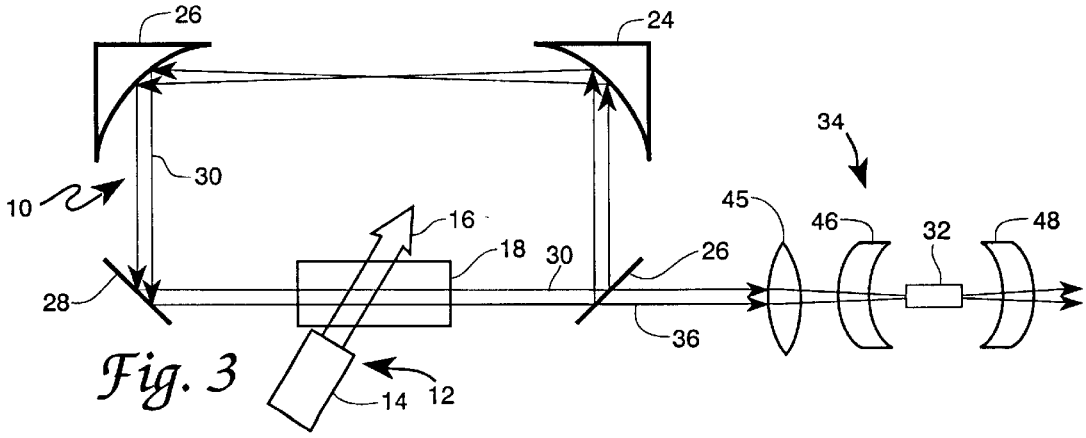

Reference is made to FIG. 3 showing another alternative embodiment of the diode pumped optical parametric oscillator 10 of the present invention. This embodiment includes the same ring resonator cavity 20 as described above, but differs in that the optical parametric oscillator 34 in this embodiment is of the standing wave type utilizing a focusing lens 45 and two resonator mirrors, 46 and 48. Mirror 46 is transparent at the output beam (pump) 36 wavelength but highly reflective at the signal and idler wavelengths. Similarly, mirror 48 is highly transmissive of the desired output wavelength (signal or idler) and highly reflective of the other wavelength. In this way emission of optical radiation at the desired wavelength is facilitated.

In summary, numerous benefits have been described from utilizing the principles of the present invention. The diode pumped optical parametric oscillator 10 of the present invention provides for an efficient, tunable laser utilizing a quasi-phase matched PPLN crystal pumped by a MOPA semiconductor diode laser.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. An apparatus for generating optical radiation, comprising:

a source of coherent light;

a ring resonator cavity for receiving, amplifying and converting said coherent light to a high quality, single frequency beam, said ring resonator cavity including a photorefractive crystal; and, a frequency conversion element coextensive with said ring resonator cavity positioned to receive said single frequency beam, said frequency conversion element having a nonlinear medium located within for converting said single frequency beam into signal and idler beams.

2. The apparatus of claim 1 wherein said ring resonator cavity is formed by four mirrors.

3. The apparatus of claim 1 wherein said photorefractive crystal is $BaTiO_3$.

4. The apparatus of claim 1 wherein said nonlinear medium is periodically poled $LiNbO_3$.

5. The apparatus of claim 1 wherein said source of coherent light is a diode laser.

6. The apparatus of claim 5 wherein said diode laser is a master oscillator power amplifier semiconductor laser.

7. An apparatus for generating optical radiation, comprising:

a source of coherent light;

a ring resonator cavity for receiving, amplifying and converting said coherent light to a high quality, single frequency beam, said ring resonator cavity including a photorefractive crystal; and, a frequency conversion element positioned to receive said single frequency beam, said frequency conversion element having a nonlinear medium located within for converting said single frequency beam into signal and idler beams.

8. The apparatus of claim 7 wherein said ring resonator cavity is formed by four mirrors.

9. The apparatus of claim 8 wherein said photorefractive crystal is $BaTiO_3$.

10. The apparatus of claim 7 wherein said nonlinear medium is periodically poled $LiNbO_3$.

11. The apparatus of claim 7 wherein said source of coherent light is a diode laser.

12. The apparatus of claim 11 wherein said diode laser is a master oscillator power amplifier semiconductor laser.

13. The apparatus of claim 7 wherein said frequency conversion element is a standing wave cavity defined by a focusing lens and two mirrors.

* * * * *